United States Patent [19]
Wang

[11] Patent Number: 6,034,168
[45] Date of Patent: Mar. 7, 2000

[54] HOT MELT ADHESIVE HAVING CONTROLLABLE WATER SOLUBILITY

[75] Inventor: Baoyu Wang, Waukesha, Wis.

[73] Assignee: Ato Findley, Inc., Wauwatosa, Wis.

[21] Appl. No.: 09/178,039

[22] Filed: Oct. 23, 1998

[51] Int. Cl.⁷ ............... C08L 53/00; C08L 101/04; B32B 7/12
[52] U.S. Cl. ............... 524/505; 524/612; 525/92 A; 428/346; 428/355 CN; 428/344
[58] Field of Search ............... 524/505, 612; 428/344, 346, 355 CN; 525/92 A, 98

[56] References Cited

U.S. PATENT DOCUMENTS

| | | | |
|---|---|---|---|
| 4,052,368 | 10/1977 | Larson | 528/293 |
| 4,172,824 | 10/1979 | Harrington, Jr. et al. | 524/292 |
| 4,325,851 | 4/1982 | Colon et al. | 524/83 |
| 4,331,576 | 5/1982 | Colon et al. | 524/271 |
| 4,623,688 | 11/1986 | Flanagan | 524/612 |
| 4,699,941 | 10/1987 | Salerno | 525/92 |
| 4,871,803 | 10/1989 | Zimmel et al. | 525/98 |
| 5,071,914 | 12/1991 | Zimmel et al. | 525/92 |
| 5,143,961 | 9/1992 | Scholl et al. | 524/317 |
| 5,459,184 | 10/1995 | Bunnelle et al. | 524/221 |
| 5,543,488 | 8/1996 | Miller et al. | 528/277 |
| 5,552,511 | 9/1996 | Miller et al. | 528/277 |
| 5,605,764 | 2/1997 | Miller et al. | 428/480 |

*Primary Examiner*—Peter A. Szekely
*Attorney, Agent, or Firm*—Andrus, Sceales, Starke & Sawall

[57] ABSTRACT

A water sensitive hot melt adhesive composition based on polyalkyleneimine copolymers for use with articles such as paper products, disposable nonwoven products, tapes, labels and packaging materials. By varying the amount of copolymer included in the composition as well as by varying the chain structure and the ratio of soluble versus insoluble repeating units in the copolymer, an adhesive may be formulated to modify the degree of solubility from 100% to 0% soluble in water and/or other performance characteristics. The adhesive composition includes about 10% to about 70%, by weight, of a polyalkyleneimine copolymer or a blend of one or more polyalkyleneimine copolymers; about 0% to about 70%, by weight, of a tackifying resin; about 10% to about 70%, by weight, of a compatible plasticizer; and about 0.1% to about 3% by weight of one or more antioxidant. The adhesive maintains the article in an assembled condition by providing adequate adhesive bond strength during normal use, but dissolves in the presence of water thereby permitting the article to be recycled or otherwise disposed of in an environmentally friendly manner.

22 Claims, No Drawings

HOT MELT ADHESIVE HAVING CONTROLLABLE WATER SOLUBILITY

CROSS-REFERENCE TO RELATED APPLICATIONS

N/A

STATEMENT REGARDING FEDERALLY SPONSERED RESEARCH OR DEVELOPMENT

N/A

BACKGROUND OF THE INVENTION

The present invention relates to hot melt adhesives, and more particularly to a water sensitive hot melt adhesive composition based on alkyleneimine copolymers.

The term water sensitive hot melt adhesive refers to a category of adhesives including, water soluble, water dispersible, water releasable and repulpable hot melt adhesives. The adhesive of the present invention particularly relates to water soluble and water dispersible products which can be disintegrated by the action of water, thereby permitting paper products, disposable nonwoven articles, tapes and labels, and other disposable products to be more effectively recycled. The adhesives of the present invention can be pressure sensitive or non-pressure sensitive. The present invention is also directed to water sensitive adhesives that are particularly useful in the assembly of disposable non-woven articles.

Hot melt adhesives typically exist as solid mass at ambient temperature and can be converted to flowable liquid state by the application of heat. These adhesives are particularly useful in manufacturing of a variety of disposable goods where bonding of various substrates is often necessary. Specific applications have included disposable diapers, sanitary napkins, pantyshields, surgical drapes, hospital pads and adult incontinence briefs; collectively known as disposable nonwoven products. Other diversified applications have involved paper products, packaging materials, tapes and labels. In these applications, the hot melt adhesive is heated to the molten state and then applied to a substrate. A second substrate is immediately laminated to the first and the adhesive solidifies on cooling to form a strong bond. The major advantage of hot melt adhesives is the lack of a liquid carrier, as would be the case for water-based or solvent based adhesives, thereby eliminating the costly drying step during application. Suitable hot melt adhesives must possess the appropriate bond strength to adhere the substrates involved, and must also possess adequate flexibility, no staining or bleedthrough, suitable viscosity and open time to function on commercial equipment, acceptable stability under storage conditions, and acceptable thermal stability under normal application temperature.

Many different polymers have been used in hot melt adhesives employed in the construction of disposable goods. In this regard, typical hot melt adhesives have employed polymers which have included styrene-isoprene-styrene (SIS); styrene-butadiene-styrene (SBS); styrene-ethylene-butylene-styrene (SEBS); ethylene-vinyl acetate (EVA); and amorphous poly-alpha-olefin (APAO). While these polymers, when properly blended, provide acceptable adhesion between most substrates employed in typical disposable goods construction such as diapers or packaging materials, they have had several shortcomings which have detracted from their usefulness.

One of the most noteworthy shortcomings of the prior hot melt adhesives concerns their solubility in water. Typical hot melt adhesives are insoluble in water and thus difficult to recycle. It is very desirable to recycle paper products and other disposable goods to conserve raw material resources and landfill space. It is thus a general practice in the paper industry to collect and repulp the waste paper to recover the cellulose fiber and to regenerate other useful paper products such as toilet paper or paperboard. Since no readily convenient method is currently available for recycling, or otherwise separating the components of disposable goods such as disposable diapers into component parts whereby the component parts may be recycled or alternatively disposed of in an environmentally friendly manner, to reduce any adverse impact these objects may have on the environment, concerns have frequently been raised regarding the environmental consequence of such products once they become unserviceable and disposed of in landfills or the like. The insolubility of the conventional hot melt adhesives further exacerbates such recycling problems. Thus, it would be desirable to utilize water sensitive hot melt adhesives to help solve this disposal and recycling problem since these adhesives will lose their bonding ability by soaking in water, thereby permitting the bonded object to disassemble into its component parts for easy separation and recovery. However, it must be understand that any such water sensitive hot melt adhesive must perform its intended function during storage and service where contact with moisture is, in many cases, unavoidable. As a result, the water sensitivity of hot melt adhesives must be balanced against the need to provide adequate bond strength to maintain the structural integrity of the products until disposal.

The most common water sensitive or water soluble hot melt adhesives are based on polymers containing vinyl pyrrolidone or other vinyl heterocyclic monomers as taught by Colon et al, in U.S. Pat. Nos. 4,331,576 and 4,325,851. These adhesives are made from vinyl pyrrolidone polymers, vinyl pyrrolidone/vinyl acetate copolymers, and other vinyl pyrrolidone based polymers. Another class of water sensitive hot melt adhesives include the polyester based adhesives comprising a single or a blend of copolyesters in combination with a plasticizer, which are disclosed in Morrison, U.S. Pat. No. 4,052,368, and in Harrington, Jr., et al, U.S. Pat. No. 4,172,824, and in Miller, et al, U.S. Pat. Nos. 5,543,488, 5,552,511 and 5,605,764.

The polyvinyl pyrrolidone and polyester based adhesives are typically applied as a liquid to a substrate from a reservoir or glue pot heated to temperatures between 150° C.–200° C. Water sensitive adhesives based on a polyvinyl pyrrolidone or a polyvinylpyrrolidone/vinyl acetate exhibit poor thermal stability. Such adhesive formulations can rapidly degrade at the elevated pot temperatures which are employed during their application. Copolyester based adhesives, due to the potential chemical reactivity of copolyester with many other ingredients that are often used to make a useful hot melt adhesive, suffer from limitations in formulation latitude and therefore from the lack of balance between water sensitivity and bond strength, thereby further limiting their usefulness.

Other water sensitive hot melt adhesives are based on polyvinylmethylether. They contain either water soluble or insoluble plasticizers and a large amount of water insoluble tackifier. Polyvinylmethylether has limited solubility in water which limits its utility in many applications. Also, the polymer has poor thermal stability, has a dark color raising aesthetic concerns, and has a strong objectionable odor problem.

Finally, water soluble hot melt adhesives based on substituted polyalkyleneimine (polyoxazoline) homopolymers are disclosed in Scholl et al U.S. Pat. No. 5,143,961 and Bunnelle et al U.S. Pat. No. 5,459,184. Such adhesives, however, are brittle and exhibit limited cohesive strength. In addition, such adhesives usually have high viscosity which often limit their applications in disposable goods.

Accordingly, a need exists for a hot melt adhesive composition that is substantially heat stable, water sensitive, can form strong bonds, can be formulated to be pressure sensitive.

SUMMARY OF THE INVENTION

It is an object of the present invention to provide an improved water sensitive hot melt adhesive composition which is uniquely well suited for the manufacturing of disposable goods, especially disposable nonwoven articles.

Another object of the present invention is to provide a water sensitive hot melt adhesive composition (can be pressure sensitive or non-pressure sensitive) which when employed in connection with manufacturing of disposal articles has an excellent dry bond strength, but which can be induced to delaminate when exposed to water, thereby permitting the component elements of the disposable article to be recycled or otherwise disposed of in an environmentally friendly manner. Another object of the present invention is to provide a water sensitive hot melt adhesive composition which is operable to degrade at a predetermined rate when exposed to water, and wherein the adhesive when incorporated into a disposable article maintains the article in an assembled state during its normal use notwithstanding exposure to aqueous media.

Further objects and advantages of the present invention are to provide a water sensitive hot melt adhesive composition which possesses an excellent balanced adhesion, high temperature stability and acceptable cohesive strength at a relatively low viscosity for the purpose described, and which is durable, easy to apply by utilizing conventional manufacturing techniques, and which further does not have the shortcomings attributable to the prior art adhesives utilized heretofore.

Accordingly, a hot melt adhesive may be formulated having the following composition:

(a) about 10% to about 80% by weight of a polyalkyleneimine copolymer containing both a water soluble repeating unit and a water insoluble repeating unit, or a blend of more than one polyalkyleneimine copolymers wherein the repeating units of the polyalkyleneimine copolymers may be arranged randomly or as blocks, and the preferred soluble repeating unit is 2-ethyl-2-oxazoline and the preferred insoluble repeating unit is 2-phenyl-2-oxazoline;

(b) about 10% to about 70% by weight of one or more compatible plasticizer(s);

(c) about 0% to about 70% by weight of one or more compatible tackifying resin(s);

(d) about 0.1% to about 3% by weight of one or more antioxidant(s); and (e) about 0% to about 50% by weight of a filler; the components of the composition adding up to 100% by weight. The adhesive composition may also contain other components which can modify the adhesive properties of, or add adhesive properties to, the above basic adhesive composition.

The present invention provides numerous advantages. For example, the repeating units of the polyalkyleneimine copolymer may be arranged randomly or as blocks to obtain different polymer chain architectures, and to obtain different degrees of solubility in water. Other physical properties such as glass transition temperature (Tg), storage modulus (E') and loss modulus (E") can also be varied by changing the ratio of the comonomers and by changing the molecular structure of the copolymer chain. Thus, by using the alkyleneimine copolymers, a hot melt adhesive can be formulated to modify the degree of solubility and/or other performance characteristics by varying the amount of copolymer included in the composition as well as by varying the chain structure and the ratio of soluble versus insoluble repeating units in the copolymer.

DETAILED DESCRIPTION OF THE INVENTION

The preferred hot melt adhesive composition of the present invention, as noted above includes about 10% to about 80%, by weight, of an alkyleneimine copolymer or a blend of more than one polyalkyleneimine copolymers; about 0% to about 70%, by weight, of one or more compatible tackifying resins; about 10% to about 70%, by weight, of a suitable plasticizer; about 0.1 to about 3%, by weight, of an antioxidant and about 0% to about 50%, by weight, of a filler; the components of the composition adding up to 100% by weight; and wherein the hot melt adhesive composition solubilizes at a predetermined rate when exposed to water. The hot melt adhesive composition of the present invention includes, as noted above, about 10 to about 80% by weight of alkyleneimine copolymer(s).

The alkyleneimine copolymers useful in the present composition may be represented by the following general formula (I):

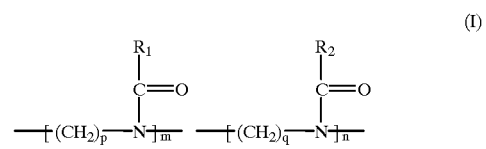

where p and q are each independently about 2–6, m and n are each independently about 20–10,000, preferably 50–5000, and $R_1$ is selected from a group of radicals that renders the repeating unit to which it is joined substantially water soluble (such as for example methyl or ethyl), and $R_2$ from a group of radicals that renders the repeating unit to which it is joined substantially water insoluble (such as for example benzyl or tolyl). Accordingly, $R_1$ and $R_2$ may each independently be selected from a substituted or unsubstituted $C_{1-15}$ hydrocarbon radicals such as alkyl or alkylsubstituted aryl, including such groups as methyl, ethyl, propyl, isobutyl, pentyl, cyclohexyl, 2-ethylhexyl, dodecyl, naphthyl, tolyl, benzyl, chloromethyl, fluoroethyl, chlorophenyl, phenylethyl, and radicals such as alkylene and arylene groups such as methylene, ethylene; ortho-, meta-, and para-phenylene; tolylene, ($C_6H_4CH_2$), chloroethylene, fluoroethylene, and chlorophenylene.

The repeating units of the alkyleneimine copolymer may be arranged randomly or as blocks to obtain different polymer chain architectures, and to obtain different degrees of solubility in water. Thus, by using the alkyleneimine copolymers, a hot melt adhesive can be formulated to modify the degree of solubility and/or other performance characteristics by varying the amount of copolymer included in the composition as well as by varying the chain structure and the ratio of soluble versus insoluble repeating units in the copolymer. The preferred soluble repeating unit is one where p is 2 and $R_1$ a $C_1$–$C_5$ alkyl group. The preferred insoluble repeating unit is one where q is 2 and $R_2$ is an aromatic hydrocarbon. In this special case, where both p and q equal to 2, the copolymers are usually prepared by polymerization of N-substituted oxazoline monomers and the copolymers so obtained are commonly known as N-substituted oxazoline copolymers, or simply oxazoline copolymers. The most preferred copolymers of the present invention are those containing 2-ethyl-2-oxazoline as the water soluble repeating unit and 2-phenyl-2-oxazoline as the water insoluble repeating unit. The number average molecular weight ($\overline{Mn}$) of the copolymer is typically greater than 20,000 and more typically between 40,000–200,000. The molecular weight is selected generally to obtain a desired final viscosity. The N-substituted oxazoline copolymers useful in the present adhesive composition may be purchased commercially from Polymer Chemistry Innovations, Inc. of Tucson, Ariz. under the trade designation "Aquazol".

In the case where $R_1$ and $R_2$ are identical, and are either both selected from water soluble repeating units or water insoluble repeating units, a homopolymer results which is either very water soluble or very water insoluble, respectively. These homopolymers could be used as blending agents with the above copolymer, or blend of copolymers, to modify the solubility characteristics thereof to obtain a blend with the desired solubility.

The tackifying resins which are used in the adhesives of the present invention are those which extend the adhesive properties and improve the specific adhesion of the polymer. The present formulation includes about 0% to about 70%, by weight, of a compatible tackifying resin. As used herein, the team "tackifying resin" includes:

(a) natural and modified rosin such as, for example, gum rosin, wood rosin, tall-oil rosin, distilled rosin, hydrogenated rosin, dimerized rosin and polymerized rosin;

(b) glycerol and pentaerythritol esters of natural and modified rosins, such as, for example, the glycerol ester of pale wood rosin, the glycerol ester of hydrogenated rosin, the glycerol ester of polymerized rosin, the pentaerythritol ester of pale wood rosin, the pentaerythritol ester of hydrogenated rosin, the pentaerythritol ester of tall-oil rosin and phenolic modified pentaerythritol ester of rosin;

(c) polyterpene resins having a softening point, as determined by ASTM method E28-58T, of from about 20° C. to about 140° C., the latter polyterpene resins generally resulting from the polymerization of terpene hydrocarbons, such as the monoterpene known as pinene, in the present of Friedel-Crafts catalysts at moderately low temperatures; also included are the hydrogenated polyterpene resins;

(d) copolymers and terpolymers of natural terpenes, e.g. styrene/terpene, alpha-methyl styrene/terpene and vinyl toluene/terpene;

(e) phenolic-modified terpene resins such as, for example, the resin product resulting from the condensation, in an acidic medium, of a terpene and a phenol;

(f) aliphatic petroleum hydrocarbon resins having Ring and Ball softening points of from about 10° C. to about 140° C., the latter resins resulting from the polymerization of monomers consisting primarily of olefins and diolefins; also included are the hydrogenated aliphatic petroleum hydrocarbon resins; examples of such commercially available resins based on a $C_5$-olefin fraction of this type are "Wingtack 95 " and "Wingtack 115" tackifying resins sold by Goodyear Tire and Rubber Company;

(g) aromatic petroleum hydrocarbons and the hydrogenated derivatives thereof;

(h) aliphatic/aromatic petroleum derived hydrocarbons and the hydrogenated derivatives thereof.

Mixtures of two or more of the above described tackifying resins may be required for some formulations. Although a range of 0%–70%, by weight, of tackifying resins may be used, the preferred range is 15% to 50%. An example of a commercially available tackifying resin which is useful for the present invention includes the resin which is identified commercially by the trade designation Nirez v2040. This resin is a terpene-phenolic resin available from Arizona Chemical Company.

Commercially available polymerized rosins may be secured from Arizona Chemical Company under the trade designations "Sylvatac 295, RX, R85, 95 and 140" respectively. Additionally, Hercules, Inc. produces a suitable dimerized rosin under the trade designation "Demerex". Commercially suitable partially hydrogenated rosins may also be secured from Hercules, Inc. under the trade designations "Foral AX" and "Stabelite". Finally, partial esters of dibasic modified tall oil rosins may be secured from Arizona Chemical Company under the trade designations "Sylvatac 203" and "Beckacite 4901".

Both water soluble and water insoluble plasticizers can be present in the composition of the present invention in amounts of about 10% to about 70% by weight, preferably from about 20% to 50% by weight, in order to provide desired viscosity control and water solubility without substantially decreasing the adhesive strength or the service temperature of the adhesive. Both liquid and solid plasticizers can be used in the composition of the present invention.

The water soluble plasticizers used herein comprise low molecular weight polyethylene glycols, multifunctional alcohol and the general class of surfactants wherein the molecules contain both a hydrophilic group and a hydrophobic group. The hydrophilic group of the molecule generally consists of, but is not limited to, polyethylene glycol, polypropylene glycol, a mono- or di- hydroxylated amine group, an ethoxylated amino radical, polyalkylene glycol esters of carboxylic group, substituted or unsubstituted glycerol, glucose, sucrose and sorbitan groups. The hydrophobic group of the molecule generally consist of, but is not limited to, a hydrocarbon radical such as, alkylphenol groups, dialkyl phenol groups, or a linear or branched aliphatic radicals. The preferred soluble plasticizers include ethoxylated alkyphenols, ethoxylated fatty acids and ethoxylated fatty alcohol having a HLB value in the range of 8.0–20.0. An ethoxylated alkyphenol with HLB value of 13.5 can be obtained under the trade designation Triton X-100 from Union Carbide Corporation of Danbury, Conn., and water soluble ethoxylated fatty acids, such as polyethylene glycol 600 monolaurate (HLB=14.6) and polyethylene glycol 1000 dilaurate (HLB=14.2), can be purchased from Stepan Company of Northfield, Ill. under the trade designations of Kessco PEG 600MC and Kessco PEG 1000DL, respectively.

A suitable insoluble plasticizer may be selected from the group which includes dipropylene glycol dibenzoate; pentaerythritol tetrabenzoate; polyethylene glycol 400-di-2-ethylhexoate; 2-ethylhexyl diphenyl phosphate; butyl benzyl phthalate, dibutyl phthalate and dioctyl phthalate. Suitable dipropylene glycol dibenzoate and pentaerythritol tetrabenzoate may be purchased from Velsicol Chemical Company of Chicago, Ill. under the trade designations "Benzoflex 9-88 and S-552", respectively. Further, a suitable polyethylene glycol 400-di-2-ethylhexoate may be purchased from C.P. Hall Company of Chicago, Ill. under the trade designation "Tegmer 809". A suitable 2-ethylhexyl diphenyl phosphate, and a butyl benzyl phthalate may be purchased from Monsanto Industrial Chemical Company of St. Louis, Mo. under the trade designation "Santicizer 141 and 160", respectively.

The aforementioned plasticizers can be each used alone or in any combination of two or more plasticizers in the adhesive composition of the present invention in an amount of 10% to 70% by weight.

The present invention includes a stabilizer or antioxidant in an amount of from 0.1% to about 3% by weight, but preferably from about 0.1 to 1%. The stabilizers which are useful in the hot melt compositions of the present invention are incorporated to help protect the polymers noted above, and thereby the total adhesive system, from the effects of thermal and oxidative degradation which normally occurs during the manufacturing and application of the adhesives as well as in the ordinary exposure of the final product to the ambient environment. Such degradation is usually manifested by a deterioration in the appearance, physical properties and performance characteristics of the adhesive. Among the applicable stabilizers or antioxidants are phosphites, thioesters, substituted amines, mercaptobenzimidazole derivatives, hydroquinone derivatives, hindered phenols and multifunctional phenols, such as sulfur and phosphorus-containing phenols. Particularly useful stabilizers or antioxidants are hindered phenols. Hindered phenols are well known to those skilled in the art and may be characterized as phenolic compounds which also contain sterically bulky radicals in close proximity to the phenolic hydroxyl group thereof. Representative hindered phenols include:

1,3,5-trimethyl-2,4,6-tris(3,5-di-tert-butyl-4-hydroxybenzyl)benzene;
n-octadecyl-3-(3,5-ditert-butyl-4-hydroxyphenyl) propionate;
4,4'-methylenebis(4-methyl-6-tert butylphenol);
4,4'-thiobis(6-tert-butyl-o-resol);
2,6-ditert-butylphenol;
6-(4-hydroxyphenoxy)-2,4-bis(n-octylthio)-1,3,5-triazine;
2,4,6-tris(4-hydroxy-3,5-di-tert-butylphenoxy)-1,3,5-triazine;
di-n-octadecyl-3,5-di-tert-butylbenylphosphonate;
2-(n-octylthio)ethyl-3,5-di-tert-butyl-4-hydroxybenzoate; and
sorbitol hexa-(3,3,5-di-tert-butyl-4-hydroxy-phenyl) propionate.

An especially preferred antioxidant is Irganox 1010, a tetrakis(methylene(3,5-ditert-butyl-4-hydroxyhydrocinnamate))methane manufactured by Ciba Geigy.

The performance of these stabilizers may be further enhanced by utilizing, in conjunction therewith; (1) synergists such as, for example, thiodipropionate esters and phosphites; and (2) chelating agents and metal deactivators such as, for example, ethylenediaminetetraacetic acid, salts thereof, and disalicylalpropylenediimine.

Fillers and other optional additives may be incorporated into the adhesive composition in order to modify particular physical properties. These additives may include colorants, such as titanium dioxide and fillers such as talc, calcium carbonate and clay, which as noted above can be present in amounts ranging from 0% to about 50% by weight.

The adhesive composition useful in the method of the present invention may be formulated using any of the techniques known in the art. A representative example of the prior art procedure involves placing all the components, except the alkyleneimine copolymer, in a jacketed mixing kettle equipped with a rotor. The contents of the kettle are then heated to a temperature between 200 to 400° F. at which they become a flowable liquid. The polymer is subsequently introduced to the kettle under agitation and the mixing is allowed to continue until a smooth and uniform mixture is formed.

The adhesive composition of the present invention may be used in a variety of applications. For example, the resulting pressure sensitive adhesives may be coated on paper and plastic film substrates to form repulpable or peelable tape and label stocks. The nonpressure sensitive adhesives may be utilized in manufacturing corrugated boxes, in carton sealing and bookbinding applications.

They may also be used in manufacturing of toilet tissues, paper towels, wipes and other consumer products as the laminating adhesive to bind a plurality of substrate layers.

The water sensitive hot melt adhesives of the present invention, in both pressure sensitive and nonpressure sensitive forms, are especially useful in assembly or construction of disposable nonwoven articles to bind a substrate composed of nonwoven fabric, tissue, absorbent fluff, superabsorbent materials, elastic bands or the like to another substrate. This second substrate may be another nonwoven fabric, tissue, fluff, superabsorbent material, or plastic materials such as, for example, polyethylene or polypropylene film.

The water sensitive hot melt adhesives of the present invention can be coated or applied with a variety of application techniques known in the art, which include, for example, slot die, spiral spray, melt blown, extrusion, application wheel, or other known application apparatus.

The invention is further illustrated by way of the examples which are set forth below:

EXAMPLE 1

A water sensitive hot melt adhesive was prepared by charging into a mixing vessel equipped with a heater and an agitator, 107.3 g ethoxylated alkylphenol plasticizer (Triton X-100, Union Carbide), 79.9 g terpene phenolic tackifying resin (Nirez V2040, Arizona Chemical) and 0.5 g hindered phenol antioxidant (Irganox 1010, Ciba Additives). The contents of the vessel was heated to 350° F. to melt the tackifying resin. Next, 62.3 grams of 2-ethyl-2-oxazoline/2-phenyl-2-oxazoline block copolymer having a total molecular weight of approximately 50,000 and 10%, by weight, of 2-phenyl-2-oxazoline comonomer (Aquazol HVIS, Kinematic viscosity in 10% aqueous solution=9.8 cSt, Polymer Chemistry Innovations, Inc) was slowly added under agitation. The mixture was stirred at a constant temperature of 350° F. until a smooth and uniform mixture was formed. The adhesive is almost odorless and has light amber color. It has a viscosity of 1800 cps at 325° F. and a Ring and Ball softening point of 161° F. The adhesive is useful in the assembly of disposable nonwoven articles.

Onto a 1 mil thick polyethylene film, the adhesive was applied in the amount of 14 g/m2 by spiral spray method from a hot melt coater (Model LH1, Acumeter Laboratories) at 350° F. The coated polyethylene film was immediately laminated on line to a polypropylene nonwoven substrate to form an assembly typically found in disposable nonwoven articles such as in diapers and sanitary napkins. The 180° peel strength of the laminate, as measured by Instron Tester at 12"/min crosshead speed, is about 261 g/cm coated width. The water sensitivity of the adhesive is demonstrated by dipping the specimen into water at the ambient temperature. After two minutes of soaking, the adhesive losses its bond strength and the specimen will delaminate.

EXAMPLES 2–4

These examples demonstrate the formulation of hot melt adhesives with controlled water sensitivity. The water sensitive hot melt adhesives in Examples 2–4, containing a 2-ethyl-2-oxazoline/2-phenyl-2-oxazoline block copolymer (Aquazol HVIS), an ethoxylated alkylphenol plasticizer (Triton X-100), a terpene-phenolic tackifying resin (Nirez V2040) and a hindered phenol antioxidant (Irganox 1010) in the amounts shown in Table 1, were prepared by using the same procedure as in Example 1.

TABLE 1

| | Example | | |
|---|---|---|---|
| Component | 2 | 3 | 4 |
| copolymer, Aquazol HVIS | 85 | 44 | 57.9 |
| plasticizer, Triton X-100 | 106.3 | 121 | 72.4 |
| tackifying resin, Nirez V2040 | 85 | 110 | 114.7 |
| Antioxidant, Irganox 1010 | 2.75 | 2.75 | 2.75 |
| softening point (° F.) | 105 | 166 | 207 |
| color | amber | amber | amber |
| viscosity at 325° F. (cPs) | 1,150 | 2,500 | 4,050 |

The adhesives in Example 2–4 are all soluble/dispersible in water.

The adhesives of Examples 2–4 were each coated onto the same polyethylene film as described in Example 1 to a thickness of about 1.0 mil by slot die coating method with the same coating equipment as describe in Example 1 at an application temperature between 250° F. and 300° F. The coated polyethylene film was immediately laminated on line to the nonwoven substrate described above to form a laminate. Each laminate showed substrate destructive bond when dry. However, when soaked in water in the same manner as in Example 1, each adhesive requires different amounts of time to delaminate. The time of soaking required for delamination is shown in Table 2.

TABLE 2

| Example | Time to Delaminate (min.) |
|---|---|
| 2 | 3 |
| 3 | 6 |
| 4 | 15 |

EXAMPLE 5

A pressure sensitive adhesive was prepared by adding into a mixing vessel equipped with a heater and an agitator, 107.3 grams of ethoxylated alkylphenol plasticizer (Triton X-40, Union Carbide Corporation), 79.9 grams of terpene phenolic tackifying resin (Nirez V2040) and 1.25 grams of hindered phenol antioxidant (Irganox 1010) and subsequently heating up the contents to 325° F. Next 62.3 grams of 2-ethyl-2-oxazoline/2-phenyl-2-oxazoline random copolymer having a kinematic viscosity of 30 cSt in 10% aqueous solution (average molecular weight of 150,000) and about 10%, by weight, 2-phenyl-2-oxazoline comonomer was added slowly under stirring. The contents of the vessel were continuously agitated at 325° F. until a smooth and uniform mixture was obtained. The adhesive has an amber color, a Brookfield viscosity of 2530 cps at 275° F. and a Ring & Ball softening point of 166° F. The adhesive was applied as a melt to a white photocopy paper of 8"×11" dimension to about 1.5 mil thickness with a draw-down bar to give a pressure sensitive sheet. A strip of 2"×4" was cut off the sheet and adhered to a glass jar. A fiber tear bond is resulted when dry. After 10 minutes soaking in tap water at the ambient temperature, the paper substrate becomes peelable and can be easily removed from the jar.

EXAMPLE 6

The procedure in Example 5 was repeated with the following components: 50.0 grams of dipropylene glycol dibenzoate plasticizer (Benzoflex 9-88), 111.25 grams of hydrogenated rosin (Foral AX, Hercules Corporation), 1.25 grams hindered phenol antioxidant (Irganox 1010) and 87.5 grams of 2-ethyl-2-oxazoline/2-phenyl-2-oxazoline block copolymer (Aquazol HVIS). The resulting adhesive has a light brown color, a melt viscosity of 2100 cps at 325° F. and a Ring & Ball softening point of 180° F., and is dispersible in tap water at the ambient conditions. The adhesive is useful for tissue lamination, nonwoven binding and carton sealing.

EXAMPLE 7

A pressure sensitive hot melt adhesive was prepared by placing 148.0 grams of glycerol (Aldrich Chemicals, Milwaukee, Wis.) and 2.0 grams of a hindered phenol antioxidant (Irganox 1010) into the mixing vessel describe above. The contents of the vessel was then heated to 325° F. while stirring. Next, 50 grams of 2-ethyl-2-oxazoline/2-phenyl-2-oxazoline block copolymer having 50,000 average molecular weight and 10% 2-phenyl-2-oxazoline comonomer (Aquazol HVIS) and 50.0 grams of random copolymer (Aquazol HP) having approximately equal molecular weight and comonomer content was slowly added to the vessel under stirring. The mixture was kept stirring at 325° F. until a smooth and uniform mixture was formed. The adhesive is completely soluble in water, and has a light amber color and a melt viscosity of 2300 cps at 250° F. It is useful for repulpable tape and label applications.

EXAMPLE 8

Into a mixing vessel equipped with a heater and an agitator were charged 98.75 grams of ethoxylated alkylphenol plasticizer (Triton X40), 100.0 grams of a dimerized rosin (Dymerex, Hercules Corporation) and 1.25 grams of a hindered phenol antioxidant (Irganox 1010). The contents of the vessel were then heated to 325° F. Next, 25.0 grams of calcium carbonate ($CaCO_3$) were added and the mixture was stirred until calcium carbonate became uniformly dispersed. Finally, 33.0 grams of a 2-ethyl-2-oxazoline/2-phenyl-2-oxazoline random copolymer (Aquazol HP, kinematic viscosity=13.0 in 10% aqueous solution, average molecular weight 50,000 and comonomer 2-phenyl-2-oxazoline content of 10% by weight, Polymer Chemistry Innovations, Inc.) was slowly introduced. The mixture was stirred at 325° F. until a smooth and uniform mixture was formed. The adhesive has a melt viscosity of 1035 cps at 275° F. and a Ring & Ball softening point of 108° F.

The adhesive was applied as beads to a corrugated box and the box was immediately sealed. The adhesive solidifies quickly to give a fiber-tear bond when dry. However, the bond lost its strength and allowed the seal to open after 2 minutes soaking in tap water at ambient temperature.

EXAMPLE 9

This example demonstrates the thermal stability of the adhesive composition of the present invention. Two hundredgrams of the adhesive samples of Examples 1–8 were each separately transferred to a glass jar and placed in an air-circulating oven at 325° F. for a 48 hour period. The adhesives were each examined for signs of thermal degradation such as skinning, gelling, darkening and ring formation and the results are listed in Table 3.

TABLE 3

|  | Skinning | Gelling | Darkening | Ring Formation |
|---|---|---|---|---|
| Example 1 | none | none | none | none |
| Example 2 | none | none | none | none |
| Example 3 | none | none | none | none |
| Example 4 | none | none | none | none |
| Example 5 | none | none | none | none |
| Example 6 | none | none | slight | none |
| Example 7 | none | none | slight | slight |
| Example 8 | none | none | none | slight |

All the adhesives showed no sign of severe thermal degradation.

EXAMPLE 10

The adhesives of Examples 5 and 8 were each coated from the melt on unbleached Kraft linerboard of 76 lb/ream basis weight to a thickness of approximately 1.0 mil. Each coated linerboard was then cut into 1"×1" squares. Approximately 10 grams of cut paper were placed into a Waring blender containing about 490 grams of tap water at near neutral pH. After 120 minutes soaking at the ambient temperature, the contents of the blender were agitated at 3500 rpm for about 30 minutes to obtain a secondary pulp slurry of 2% consistency. Following the repulping, an aliquot of 200 grams of the pulp was removed from the Waring blender and diluted to 0.5% consistency with tap water. The diluted pulp was then poured into a Buchner funnel that contained a screen of 150 micron mesh size. Vacuum was drown for a short interval until water was drained from the funnel and a handsheet was formed. The handsheet was removed from the funnel and blotted with Whatman 4 filter paper. The handsheet was then dried on a hot plate. The dried handsheet was subsequently examined for adhesive contaminants or "stickies". The handsheet so obtained was found to be free of any adhesive contamination or stickies, indicating that the adhesive coated on the paper had been solublized or dispersed in water and therefore, could be easily separated from the pulp. This test showed that the adhesives in the example are completely repulpable.

Without deviating from the spirit and scope of the present invention, many embodiments and variations can be made by using the components disclosed above.

I claim:

1. A heat stable water sensitive hot melt adhesive composition, comprising:

(a) about 10% to about 80%, by weight, of a N-substituted alkyleneimine copolymer, said N-substituted alkyleneimine copolymer is selected from the group consisting of a block copolymer and a random copolymer of formula I:

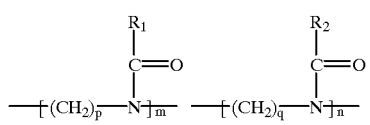

(I)

wherein p and q are each independently about 2–6, m and n are each independently about 20–10,000, $R_1$ is selected from a grout of radicals that renders the repeating unit to which it is joined substantially water soluble, and $R_2$ is selected from a group of radicals that renders the repeating unit to which it is joined substantially water insoluble;

(b) about 0% to about 70%, by weight, of a compatible tackifying resin; and (c) about 10% to about 70%, by weight, of a plasticizer, the components of the composition adding up to 100% by weight, and wherein the adhesive composition maintains the integrity of a disposable article during normal use but degrades in the presence of water thereby permitting the disposable article to be easily disassembled and subsequently recycled.

2. The composition of claim 1 wherein m and n are each independently about 50–5,000.

3. The composition of claim 1 wherein $R_1$ and $R_2$ may each independently be selected from a $C_1$–$C_{15}$ hydrocarbon radical.

4. The composition of claim 3 wherein said hydrocarbon radical is an alkyl, an alkylsubstituted aryl, an alkylene, or an arylene.

5. The composition of claim 4 wherein said hydrocarbon radical is selected from the group consisting of methyl, ethyl, propyl, isobutyl, pentyl, cyclohexyl, 2-ethylhexyl, dodecyl, naphthyl, tolyl, benzyl, chloromethyl, fluoroethyl, chlorophenyl, phenylethyl, methylene, ethylene; ortho-, meta-, and para-phenylene; tolylene, chloroethylene, fluoroethylene, and chlorophenylene.

6. The composition of claim 1 wherein the amount of monomer containing $R_2$ ranges from about 5% to about 50% by weight.

7. The composition of claim 1 wherein the N-substituted alkyleneimine block copolymer comprises 2-ethyl-2-oxazoline/2-phenyl-2-oxazoline block copolymer of the formula (I) wherein $R_1$ is an ethyl group and $R_2$ is a phenyl group, p and q each equal 2, and n and m are each independently about 50–5000.

8. The composition of claim 1 wherein the N-substituted alkyleneimine random copolymer comprises a copolymer of 2-ethyl-2-oxazoline and 2-phenyl-2-oxazoline having a number average molecular weight ranging from 20,000 to 1,000,000, and the amount of 2-phenyl-2-oxazoline water insoluble monomer ranging from 5% to 50% by weight.

9. The composition of claim 1 wherein the compatible tackifying resin is selected from the group consisting of polymerized rosin, hydrogenated and partially hydrogenated rosin, terpene-phenolics, rosin acids, rosin esters, polyterpene resins, as well as styrene, α-methylstyrene and vinyl toluene modified terpene resins, and synthetic hydrocarbon resins.

10. The composition of claim 1 wherein the plasticizer is water soluble and is selected from the group consisting of polyethylene glycol ranging from 200–2000 in molecular weight, glycerol and a surfactant having both a hydrophilic moiety and a hydrophobic moiety.

11. The composition of claim 10 wherein the hydrophilic moiety of said surfactant is selected from the group consisting of polyethylene glycol, polypropylene glycol, mono- or di- hydroxylated amine group, ethoxylated amino radical, polyalkylene glycol esters of carboxylic group, glycerol, glucose, sucrose and sorbitan groups.

12. The composition of claim 10 wherein the hydrophobic group of said surfactant is selected from the group consisting of alkylphenol groups, dialkyl phenol groups, and a linear or branched aliphatic radical.

13. The composition of claim 10 wherein the plasticizer is selected from the group consisting of polyoxyethylene aryl ethers, ethoxylated fatty acids and ethoxylated fatty alcohol's having a HLB value in the range of 8.0–20.0.

14. The composition of claim 10, wherein the water soluble plasticizer comprises both liquid and solid plasticizers.

15. The composition of claim 14 wherein the water soluble plasticizer is selected from the group consisting of polyethylene glycol esters of fatty acids, polyethylene glycol ether of fatty alcohol, ethoxylated alkyphenols and partial glycerol esters.

16. The composition of claim 1 wherein the plasticizer is water insoluble and is selected from the group consisting of diethylene glycol dibenzoate, dipropylene glycol dibenzoate; pentaerythritol tetrabenzoate; polyethylene glycol 400-di-2-ethylhexoate; triethylene glycol dibenzoate, bis(2-ethylhexyl)adipate, 2-ethylhexyl diphenyl phosphate; butyl benzyl phthalate, dibutyl phthalate and dioctylphthalate.

17. The composition of claim 1 wherein the adhesive composition further includes about 0.1% to about 3%, by weight, of an antioxidant.

18. The composition of claim 1 wherein the adhesive composition further includes 0% to 50%, by weight, of a filler.

19. The composition of claim 18 wherein said filler is selected from the group consisting of talc, calcium carbonate, clay, silica, mica, wollastonite, feldspar, aluminum silicate, alumina, hydrated alumina, glass microspheres, ceramic microspheres, thermoplastic microspheres, baryte and wood flour.

20. The composition of claim 1 wherein the adhesive composition further includes a colorant.

21. The composition of claim 1, wherein the said polymer comprises a blend of N-substituted alkyleneimine block copolymer and N-substituted alkyleneimine random copolymer.

22. A repulpable and water responsive pressure sensitive adhesive sheet comprising a cellulose material and the adhesive composition of claim 1.

* * * * *

UNITED STATES PATENT AND TRADEMARK OFFICE
CERTIFICATE OF CORRECTION

PATENT NO : 6,034,168
DATED : March 7, 2000
INVENTOR(S) : Baoyu Wang

It is certified that error appears in the above-identified patent and that said Letters Patent are hereby corrected as shown below:

IN THE CLAIMS:

Claim 1, col. 11, line 63　　　Delete the word "grout" and substitute therefor
(Amendment 9-17-99,　　　　　---group---
Claim 1, line 7):

Signed and Sealed this

Twenty-second Day of May, 2001

Attest:

NICHOLAS P. GODICI

Attesting Officer　　　　Acting Director of the United States Patent and Trademark Office